W. F. KEELER.
Governor.
No. 47,109.
Patented April 4, 1865.
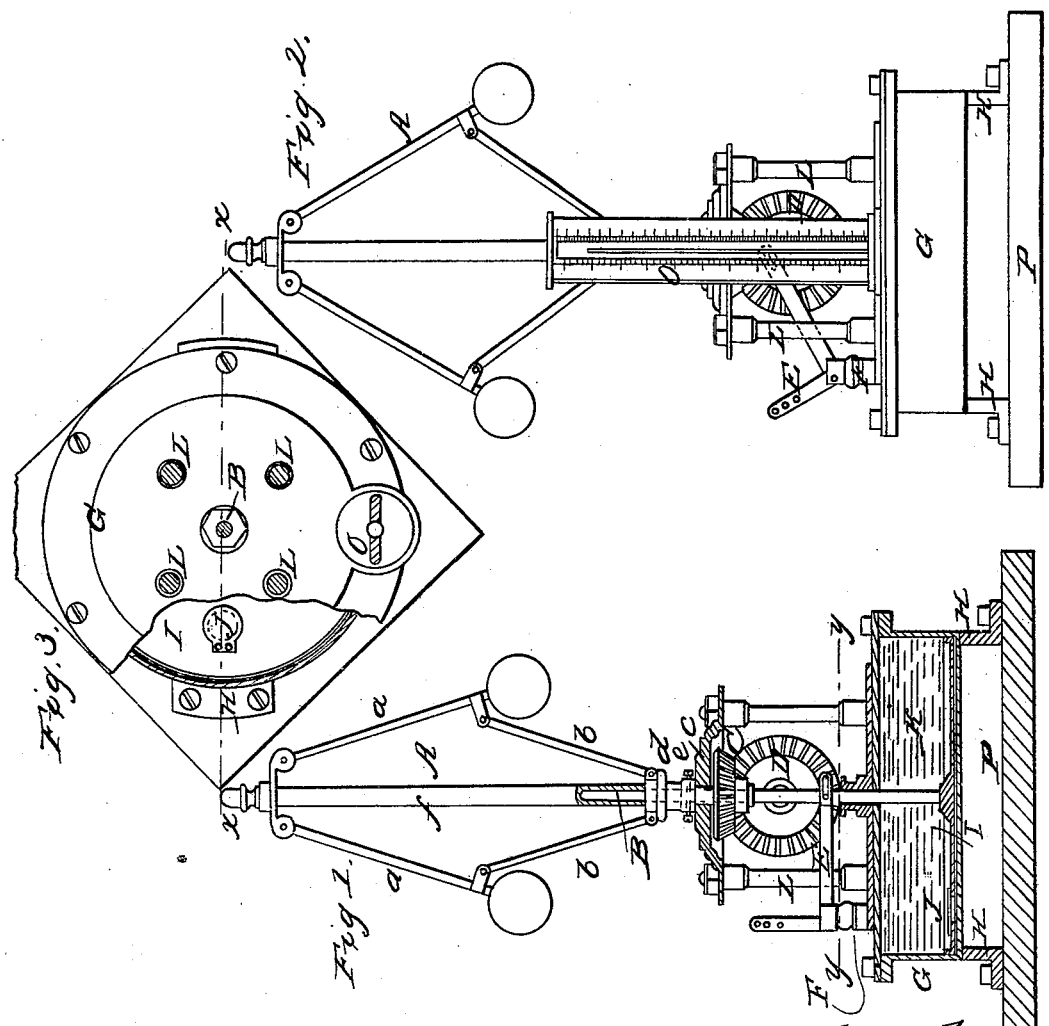

UNITED STATES PATENT OFFICE.

W. F. KEELER, OF LA SALLE, ILLINOIS.

IMPROVEMENT IN GOVERNORS.

Specification forming part of Letters Patent No. 47,169, dated April 4, 1865.

*To all whom it may concern:*

Be it known that I, W. F. KEELER, of La Salle, in the county of La Salle and State of Illinois, have invented a new and useful Improvement in Governors; and I do hereby declare that the following is a full, clear, and exact description thereof, which will enable those skilled in the art to make and use the same, reference being had to the accompanying drawings, forming part of this specification, in which—

Figure 1 is an elevation, partly in section, of a governor made according to my invention, the section being taken on the line $x$ of Fig. 3. Fig. 2 is an elevation thereof, showing the gage. Fig. 3 is a plan of the lower part of the apparatus, taken below the line $y$ of Fig. 1.

Similar letters of reference indicate like parts.

This invention consists in a governor to regulate speed and indicate the power employed and the speed obtained, wherein a column of mercury is employed to restore the moving parts to their normal condition and to measure the speed or power attained by the machinery to which the governor is attached.

P is a floor or platform, which sustains the apparatus, which is elevated, in this example, upon standards H.

G is a shallow circular metallic case with vertical sides and flat top and bottom, closed at all points except at the center of its top, where it receives the shaft B of the governor, and at one side, where it receives the glass tube of the gage O. The shaft B rises within a hollow shaft, to the top of which the arms $a$ of the governor-balls are attached, the pointed arms $b$, the balls, and the sliding collar $d$ being constructed and operated according to the customary manner. The shaft B is steadied by passing through an upper plate, $e$, which supports the hollow shaft $f$, and is itself supported by four standards, L, rising from the top of the case G.

F is a short standard, to which is connected an elbow-lever, E, one arm of which is connected to the shaft B, and the other may be connected to the valve-gear or other apparatus of the machine to be regulated.

D is a bevel-gear set upon a main or other shaft driven by such machine, meshing with a bevel-gear, C, made fast on the shaft B of the governor below the plate by means of a spline, which permits the shaft to have longitudinal motion through the center of said gear. The shaft B passes down through the center of the cover of the case G, through a suitable stuffing-box, and is fixed to the center of a circular disk, I, or movable bottom, which fits accurately within the case G. An orifice made through it at any point is covered by a clack-valve, which opens upward. The gage O may be marked with degrees or figures for measuring the speed of the main shaft as well as of any other shaft or any wheel or other part of the machine to which the governor is applied.

K represents a column of mercury, with which the case G is supplied with proper quantity so as to fill it when the disk I is at its lowest position.

The operation of the apparatus is as follows: Motion being given to the shaft B through the gears D and C, the balls of the governor will assume a position more or less elevated according to the velocity of the rotation of the shaft, and will draw up the shaft B and raise the disk I in the case G. The elevation of the disk raises the mercury in the glass tube of the gage and enables the attendant to ascertain the speed of the engine.

The capacity of the case G and of the glass tube should be the same, so that when the balls of the governor are fully extended and the disk is at its greatest height nearly all the mercury in the case will be driven up into the glass tube, and, vice versa, when the balls are down all the mercury will sink into the case. Just in proportion to the speed of the governor will be the rise of the disk and the corresponding rise of the mercury in the tube. In an exact ratio to the centrifugal force of the governor will be the pressure of the column of mercury in the tube operating against it. As the centrifugal force increases so should the pressure of the mercury increase, and in the same proportion; and, vice versa, as that force decreases the pressure decreases, thus maintaining an equilibrium between the two opposing forces, and rendering it sensitive to any changes in the machinery to which the motor may be connected. Among other advantages which are derived from this construction of governors are the steadiness given to the governor by the weight of the mercury and the certainty of the return of the shaft B to its normal position, or toward it, whenever the speed of the engine allows the balls to fall, and the weight of the column of mercury overcomes their centrifugal force.

If any portion of the mercury leaks past the sides of the disk upon the bottom of the case G, the descent of the disk will cause it to be forced up through the valve J and so returned to its place above the disk.

Having thus described my invention, I claim as new and desire to secure by Letters Patent—

1. Combining with the balls and connecting-arms of an ordinary governor for regulating and measuring the speed of a steam-engine or other machine, a column of mercury, K, resting upon a disk or movable bottom in the case in which the mercury is inclosed, substantially as above described.

2. The combination of the mercury-gage O with the closed case G, the movable disk I, and the shaft B, substantially as above described.

3. The combination of the movable disk I and shaft B with the closed case G, for containing mercury, substantially as described.

4. Balancing or controlling the centrifugal force of the balls or other rotating apparatus of a governor, for regulating speed in machinery, by means of the weight of a column of mercury rising within a gage, O, upon the stationary frame, as herein described.

W. F. KEELER.

Witnesses:
J. A. SWIFT,
GEO. H. WATROUS.